UNITED STATES PATENT OFFICE.

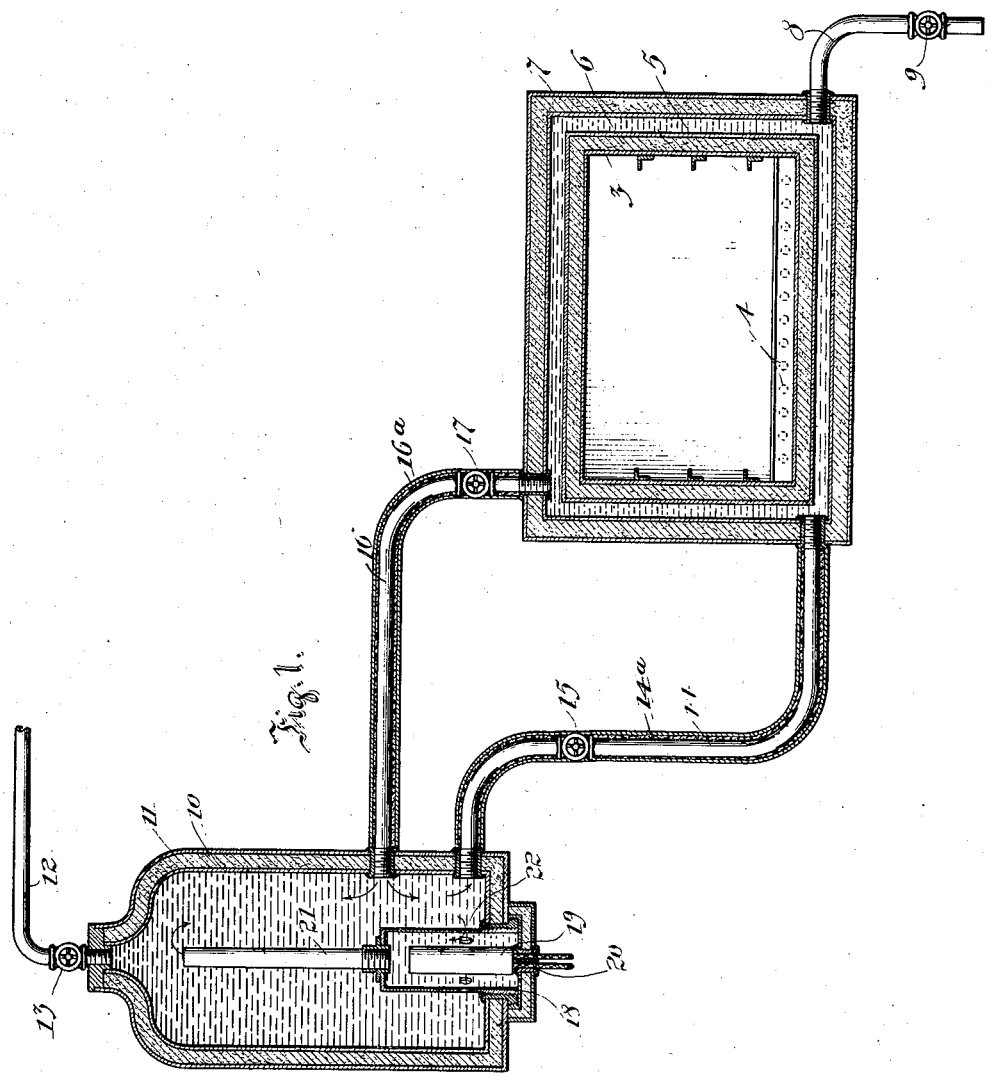

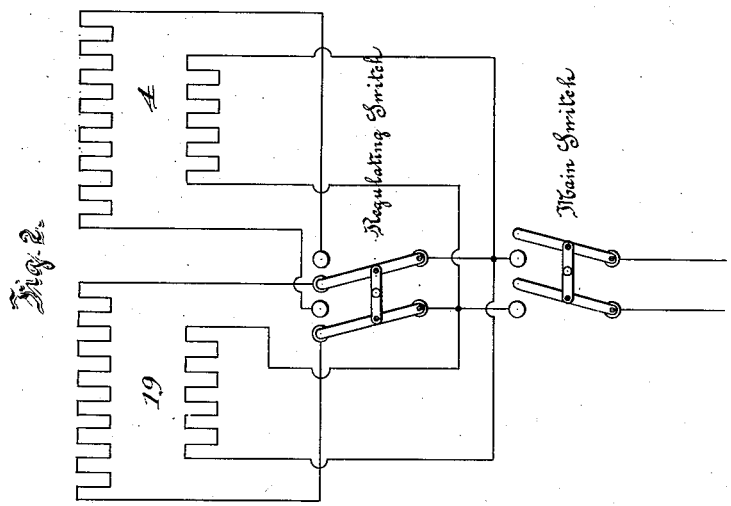
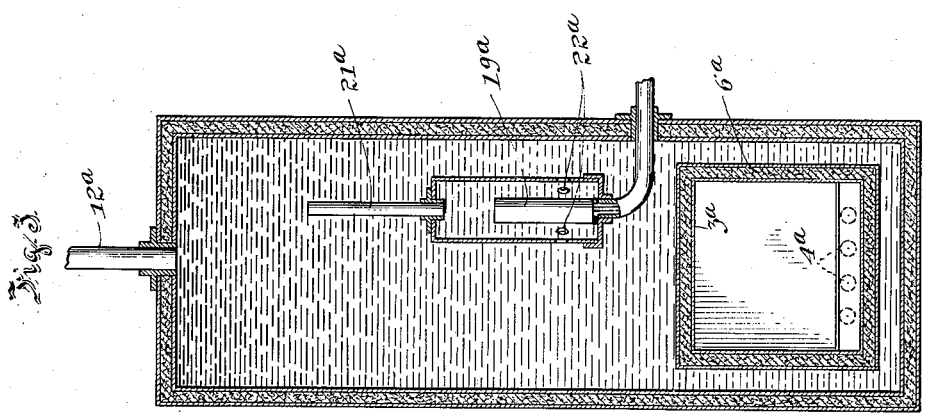

WILLIAM L. WATERS, OF MILWAUKEE, WISCONSIN.

ELECTRIC HOT-WATER HEATING SYSTEM.

1,144,954.  Specification of Letters Patent.  Patented June 29, 1915.

Application filed January 22, 1913. Serial No. 743,514.

*To all whom it may concern:*

Be it known that I, WILLIAM L. WATERS, a citizen of the United States, residing at Milwaukee, in the county of Milwaukee and State of Wisconsin, have invented certain new and useful Improvements in Electric Hot-Water Heating Systems, of which the following is a full, clear, concise, and exact description, reference being had to the accompanying drawings, forming a part of this specification.

My invention relates to electric hot water heating systems, and its object is to utilize the waste heat from an electric stove, oven, range or furnace to heat a supply of water which is subsequently delivered to the water supply tank of a hot water heating system.

In order to accomplish the above object, I provide the stove, oven, range or furnace with a heat insulating wall, which wall is surrounded by a jacket of water whose temperature is to be raised by means of the heat which otherwise would be wasted. The said heat insulating wall is interposed between the stove and the water jacket, because if said wall were not present, the water jacket would abstract the heat from the stove too rapidly. The result would be that the temperature of the stove would be unduly lowered, so that it would be difficult to perform satisfactorily any cooking operations or other functions of the stove. Around this water jacket I preferably provide a wall of heat insulating material to prevent loss of heat by radiation from the hot water jacket. The provision of this last mentioned wall is however, to be considered optional as the same may be dispensed with if desired. The hot water jacket is provided with suitable connections whereby it may be replenished with water as desired. In connection with the water jacketed stove or oven I provide a suitably insulated water supply tank, from which the water supply for a hot water distributing system is supplied. The lower end of the water jacket preferably has communication with the lower end of the water supply tank. Communication is also provided between the upper end of the water jacket and a point in the tank located above the point where the first-mentioned connection is made. By so connecting the water jacket with the hot water supply tank, I secure a circulation of water through the two passages leading from the water jacket to the tank. The stove or oven is provided with an electric heating element of any suitable type. As the temperature of the water jacket with which the stove or oven is provided is raised, due to the waste heat from the stove or oven, warm water passes from the water jacket into the water supply tank. The hot water tank is provided with an electric heating device for raising the preheated water within the tank to any desired temperature. The connections between the electric heating device of the stove or oven and the electric heater with which the hot water supply tank is provided may if desired be such that the demand for electrical energy will not at any time exceed a predetermined maximum. A desirable circuit arrangement is one in which a certain amount of electrical energy is supplied to the stove and heater continuously; there being a certain additional amount of energy which may be switched from one to the other, as desired. These and other features of the electric hot water heating system of my invention are set forth in the following description and are illustrated diagrammatically in the accompanying drawings, in which—

Figure 1 shows the stove or oven and the water supply tank in vertical section. Fig. 2 illustrates the circuit connections for the electric heating devices; and Fig. 3 illustrates in vertical section a modified form of my invention.

Similar reference numerals refer to similar parts throughout the drawings.

In Fig. 1 of the drawings I have shown a stove or oven at 3, which stove or oven is provided with an electric heating device illustrated at 4. Surrounding the stove or oven 3 is a water jacket 5, which is separated from the stove or oven by suitable heat insulation illustrated at 6. The purpose of the water jacket is to absorb and employ usefully, the waste heat from the stove and to do this without interfering with the natural operations of the same; thus the wall 6 is necessary. Around the water jacket 5 is provided a layer of heat insulating material 7 which serves to prevent loss of heat by radiation from the water jacket. A pipe 8 provided with a suitable valve 9 affords communication between the water jacket 5 and a source of water supply. The heat insulating walls above mentioned may if desired, be made of magnesium carbonate, infusorial earth or other similar material. At 10 I have illustrated a hot water tank which is provided with suitable heat insulation indicated at 11. Entering the tank 10 at the top thereof, is a pipe 12, through which hot water is taken from the tank. This pipe 12 is provided with a suitable valve 13, as shown. Affording communication between the lower end of the water jacket 5 and the lower end of the hot water tank 10 is a pipe 14, which is provided with a valve 15, as shown. Entering the jacket 5 at the top thereof and entering the hot water tank 10 at a point above the point where the pipe 14 enters the same, is a pipe 16, provided with a valve 17, as shown. As illustrated, pipes 14 and 16 are preferably provided with lagging indicated at 14ª and 16ª. It will thus be seen that as the temperature of the water jacket 5 is raised, the heated water will be circulated through pipe 16 into the tank 10 and cooler water from the tank 10 circulates through pipe 14 into the water jacket. The valves 15 and 16 are provided merely for the purpose of shutting off communication between the water jacket and water tank, if this should be desirable. Screw-threaded into the bottom of the tank 10 is a casing 18, which supports an electric heating member 19. The heating member 19 is provided in order that the water in the tank 10, which has been previously heated in the jacket 5, may be raised to any desired temperature. The conductors for the electric heating device enter the casing through the sealed aperture 20. The casing 18 is provided with a pipe 21 which extends upward almost to the top of the tank 10. The casing 18 is also provided with one or more holes illustrated at 22. It will thus be seen that when the heater 19 is in operation, a circulation of water will be maintained through the casing 18 and the pipe 21 supported thereby.

As illustrated in Fig. 2, the electric circuit connections for the heaters 4 and 19 are such that the relative amount of energy expended in these two heaters can be varied over wide limits with the restriction that the total energy consumed by the two units remains constant, keeping the energy demand within predetermined limits. In order to accomplish this operation, each of the heating units may be designed to consist of two heating coils, as diagrammatically illustrated. The electric hot water heating system of my invention is particularly designed for use in connection with electric stoves commonly known as "heat storage stoves", in which class of stoves a heat storage mass is maintained at a high temperature by means of an electric heating device. By providing such a stove with a water jacket, any heat which would otherwise escape from such heat storage mass and so be lost, is utilized in heating the water for a hot water heating system; thus all of the energy furnished to the heating device of such heat storage stove is made to perform useful work.

In the modified form of my invention illustrated in Fig. 3, the stove is indicated at 3ª and is provided with an electric heater 4ª. Said stove in this modification is located within the water tank, the water within the tank surrounding the heat insulating wall 6ª of the stove and so serving as a water jacket. The tank is provided with an individual heating element as in the tank illustrated in Fig. 1. The parts shown in Fig. 3 which conform to the parts illustrated in Fig. 1 are indicated by the same reference numerals with the addition of the letter a.

Although I have illustrated my invention in the particular embodiments herein shown and described, it is apparent to those skilled in the art that a number of modifications of my invention may be made without departing from the spirit of my invention. Although in the following claims I refer to the element provided with the water jacket as a "stove", I do not desire to be limited to a stove in a limited sense, but desire to claim broadly any equivalent applications of my invention to ranges, furnaces, ovens, etc.

What I claim and desire to secure by Letters Patent of the United States is:

1. In combination, a stove comprising a heater and an envelop of a heat conducting liquid surrounding the stove, the temperature of said liquid being raised by means of the heat escaping from said stove and which would otherwise be wasted said liquid adapted to circulate freely and an electric heater separate from the first heater immersed in the liquid constituting the envelop, said last mentioned heater being arranged to further raise the temperature of the liquid as desired.

2. In combination, a stove comprising a heater and an envelop of heat conducting liquid surrounding the stove, the temperature of said liquid being raised by the heat escaping from said stove and which would otherwise be wasted and an electric heater separate from the first heater immersed in the liquid constituting said envelop, said last mentioned heater being arranged to further raise the temperature of the liquid as desired, and a layer of heat insulating material interposed between the stove and the liquid envelop to hinder the flow of heat to said liquid and another layer of heat insulating material surrounding the liquid envelop to cut off substantially all heat losses.

3. In combination, a stove comprising a heater an envelop of heat conducting liquid surrounding the stove, the temperature of said liquid being raised and said liquid caused to circulate by the heat escaping from said stove and which would otherwise be wasted and an electric heater separate from the first heater immersed in the liquid constituting the jacket, said last mentioned heater being arranged to further raise the temperature of the liquid as desired, there being a layer of heat insulating material surrounding the envelop of heat conducting liquid.

4. In combination, a high temperature heater an envelop of heat conducting liquid surrounding said heater, the temperature of the liquid constituting the conducting envelop being raised by the escaping heat from the stove and which would otherwise be wasted, a layer of heat insulating material interposed between the liquid envelop and the heater to prevent transmission of heat to said liquid and another layer of heat insulating material surrounding the liquid envelop.

5. In combination, a high temperature heater an envelop of heat conducting liquid surrounding the heater, the temperature of the liquid constituting the conducting envelop being raised by the heat escaping from the heater and which would otherwise be wasted, said liquid being caused to circulate in said envelop, and a layer of heat insulating material surrounding the conducting envelop to cut off heat losses.

6. In combination a heater, an envelop of conducting liquid surrounding the heater, the temperature of the liquid constituting the conducting envelop being raised by the heat escaping from said heater and which heat would otherwise be wasted, a hot liquid tank having direct communication with said envelop, said envelop and said tank being connected by pipes to give a return circulation, a hot liquid distributing system supplied from said tank and an electric heater in said tank arranged to raise further the temperature of the liquid, previously warmed by the heat escaping from the heater.

7. In a hot water heating system, a heater, heat insulating material surrounding said heater to prevent the flow of heat from said heater and to allow the attainment of high temperature in said heater, a mobile conducting material surrounding said insulating material, said material automatically conducting only the heat that escapes from said heater by passing through said heat insulating material to a point remote from said heater, a second heater for heating said mobile conducting material to a higher degree, said second heater being substantially inclosed by said conducting material.

8. In combination, a high temperature heater having a layer of heat insulating material immediately surrounding said heater, an envelop of conducting fluid surrounding said heater and absorbing substantially all of the heat escaping from said heater, said conducting fluid being in free communication with a large body of said fluid whereby circulation of said fluid is free to occur and a second heater immersed in said fluid for heating the same to a higher degree.

In witness whereof, I hereunto subscribe my name this 18th day of January, A. D., 1913.

WILLIAM L. WATERS.

Witnesses:
 JOHN M. DAVIES,
 JOHN J. MCCORMICK.